(12) United States Patent
Bryant et al.

(10) Patent No.: US 8,125,716 B2
(45) Date of Patent: Feb. 28, 2012

(54) NEAR EYE DISPLAY PRISM OPTIC ASSEMBLY

(75) Inventors: Kyle R. Bryant, Owens Cross Roads, AL (US); Colin E. Reese, Lorton, VA (US); Richard J. Heimer, Melbourne, FL (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 210 days.

(21) Appl. No.: 12/578,647

(22) Filed: Oct. 14, 2009

(65) Prior Publication Data

US 2011/0085242 A1   Apr. 14, 2011

(51) Int. Cl.
*G02B 27/14* (2006.01)
*G02B 3/04* (2006.01)
(52) U.S. Cl. ........ 359/630; 359/631; 359/633; 359/637; 359/834; 359/900

(58) Field of Classification Search .................. 359/641, 359/737, 669, 663, 834, 629, 630, 631, 637, 359/720, 831, 900
See application file for complete search history.

(56) References Cited

U.S. PATENT DOCUMENTS 5,701,202 A    12/1997   Takahashi
(Continued)

*Primary Examiner* — Jack Dinh
(74) *Attorney, Agent, or Firm* — Richard J. Kim

(57) ABSTRACT

An optical assembly uses a plastic prism with one flat surface and a collimating lens optic to provide the capability of imaging a color micro-display to the eye. The collimating optic and flat prism surface can allow for aberration-free diopter adjustment and an image with very low-magnitude, nearly-symmetric distortion. The collimating optic can also provide environmental protection of the prism involving an optical plastic device. The input illumination from the micro-display enters the prism, is reflected two times within the prism, exits the prism, and passes through the collimating optic before being viewed by the eye. Such an optical assembly can provide a field of view with eye-relief and exit pupil when viewing a full-color micro-display.

19 Claims, 7 Drawing Sheets

Housing and Focus Mechanism

U.S. PATENT DOCUMENTS

| | | |
|---|---|---|
| 5,706,136 A | 1/1998 | Okuyama et al. |
| 5,745,295 A | 4/1998 | Takahashi |
| 5,768,025 A | 6/1998 | Togino et al. |
| 5,818,641 A | 10/1998 | Takahashi |
| 5,886,824 A | 3/1999 | Takahashi |
| 5,917,656 A | 6/1999 | Hayakawa et al. |
| 6,018,423 A | 1/2000 | Takahashi |
| 6,034,823 A | 3/2000 | Togino |
| 6,049,429 A | 4/2000 | Iizuka et al. |
| 6,104,540 A | 8/2000 | Hayakawa et al. |
| 6,128,136 A | 10/2000 | Togino et al. |
| 6,181,475 B1 | 1/2001 | Togino et al. |
| 6,195,207 B1 | 2/2001 | Takahashi |
| 6,317,267 B1 | 11/2001 | Takahashi |
| 6,330,121 B1 | 12/2001 | Kobayashi et al. |
| 6,687,057 B1 | 2/2004 | Yamazaki |
| 6,690,522 B2 | 2/2004 | Kobayashi et al. |
| 6,829,112 B2 | 12/2004 | Kobayashi et al. |

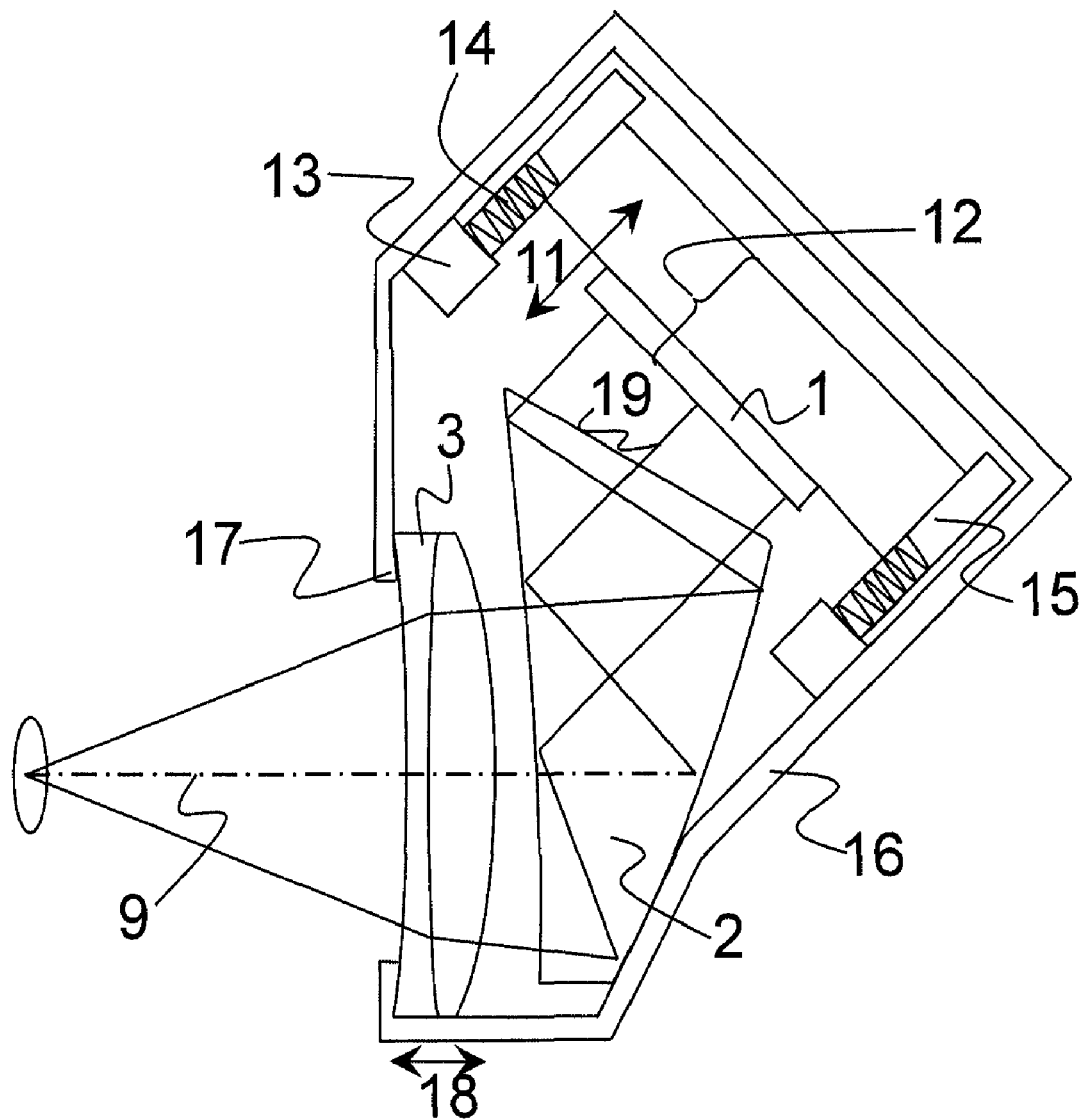
FIGURE 2: Housing and Focus Mechanism

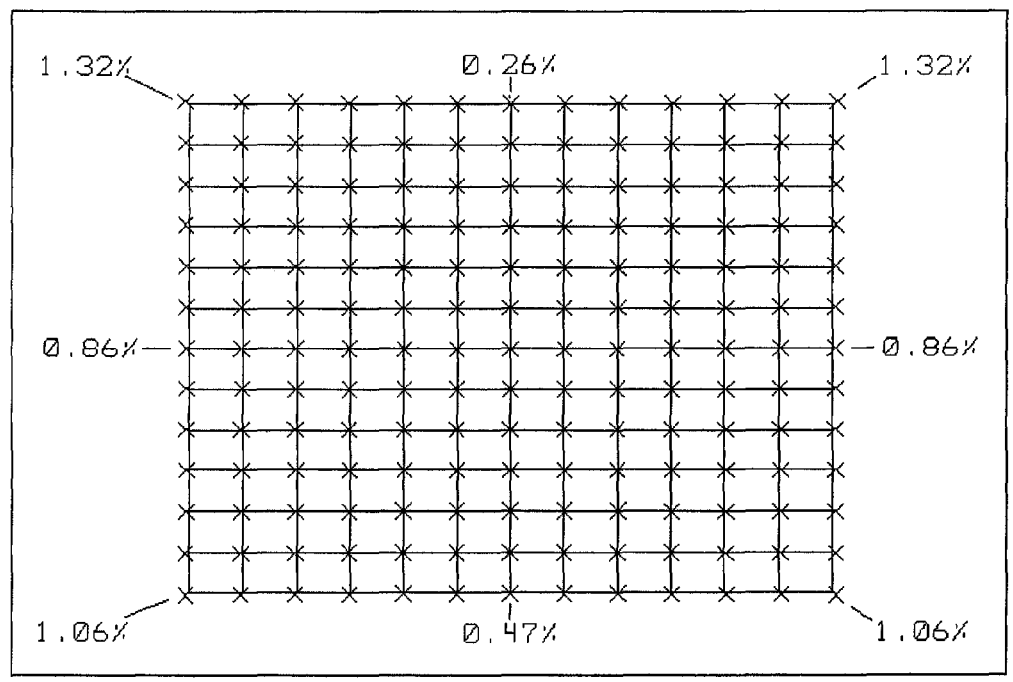
Figure 3: Distortion Plot for an Exemplary Embodiment

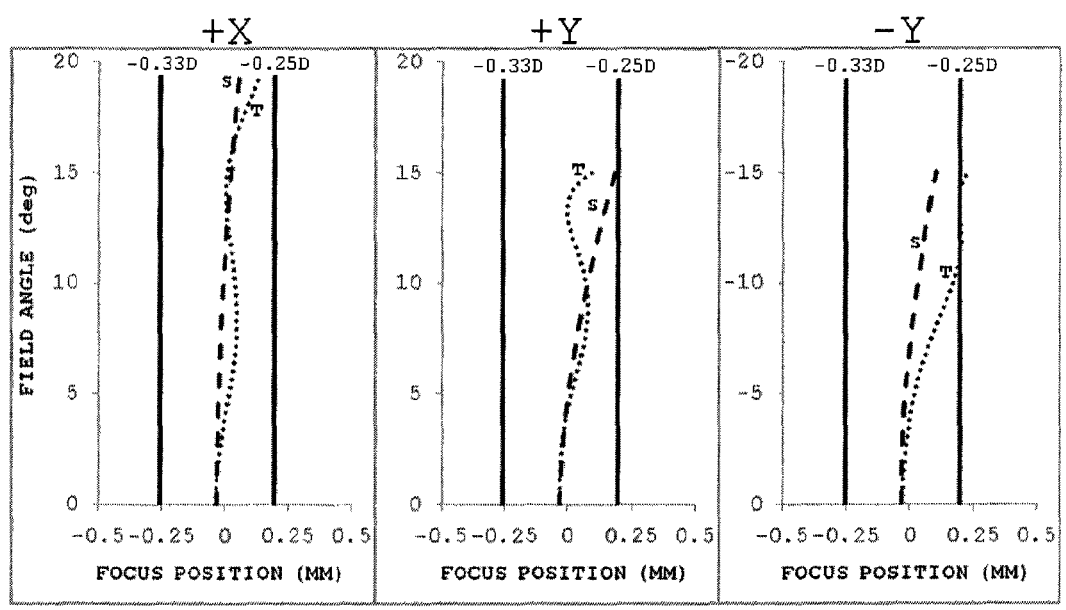
Figure 4: Astigmatic Field Curves

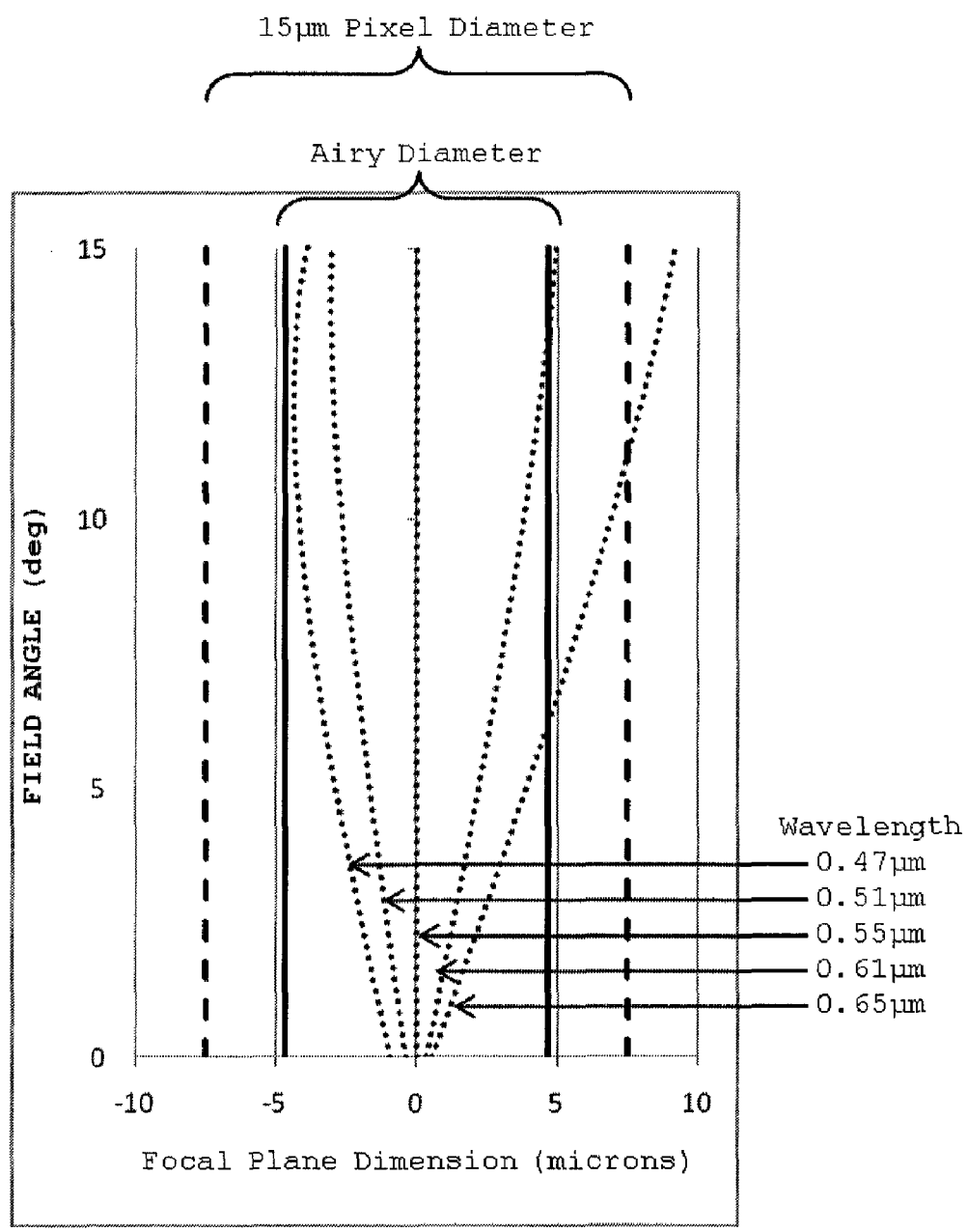
Figure 5: Lateral Color Plot

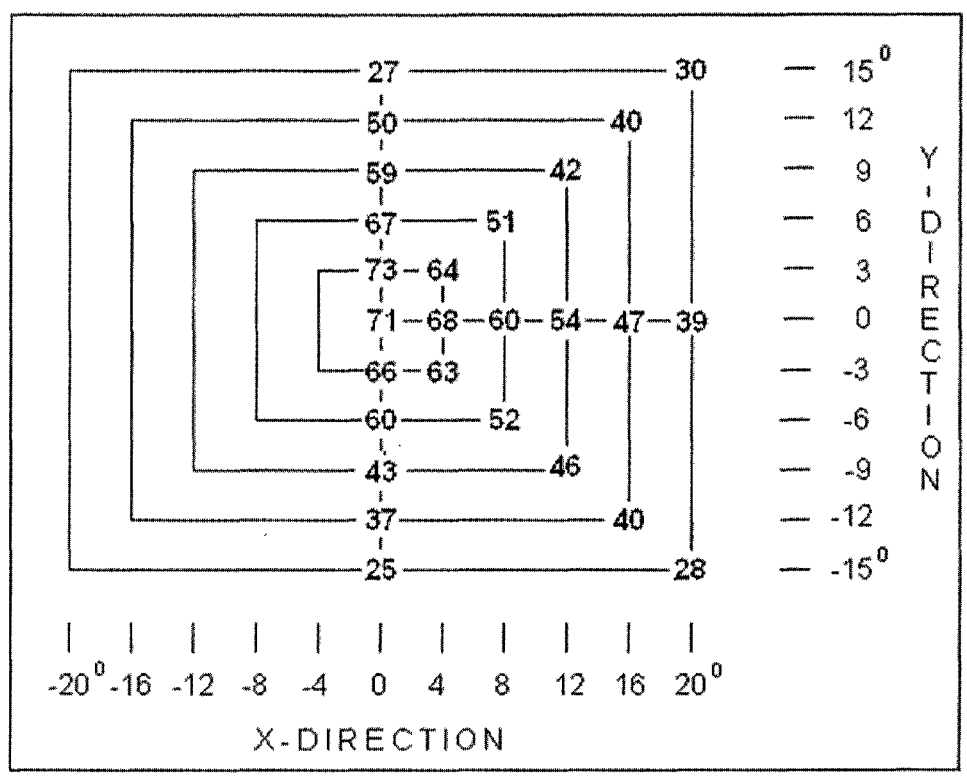
Figure 6: Average MTF at 34 cycles/mm

| Surf No. | Radius of Curvature | Surface Separation | Refractive Index (Displacement) | Abbe No. (Tilt Angle) |
|---|---|---|---|---|
| 1 (PUPIL) | PLANO | 25.00 | | |
| 2 | -118.950 | 1.504 | 1.92273 | 18.89 |
| 3 | 161.182 | 5.452 | 1.77250 | 49.62 |
| 4 | -31.216 | | | |
| 5 | $R_y$ -356.739<br>$R_x$ -171.619<br>$K_y$ 0<br>$K_x$ 0<br>$\alpha_4$ 3.56935E-06<br>$\alpha_6$ -3.61575E-08<br>$\alpha_8$ 1.86442E-10<br>$\alpha_{10}$ -3.50641E-13<br>$\beta_4$ -1.02012E-06<br>$\beta_6$ 9.79439E-09<br>$\beta_8$ -1.48273E-11<br>$\beta_{10}$ -1.06208E-13<br>$\beta_{12}$ 1.92344E-16 | | 1.53373<br>Y 9.222<br>Z 32.712 | 53.23<br>$\theta$ -4.630° |
| 6 | $R_y$ -73.251<br>$R_x$ -90.591<br>$K_y$ -1.0969<br>$K_x$ -0.8362<br>$\alpha_4$ 1.47427E-06<br>$\alpha_6$ -1.33122E-08<br>$\alpha_8$ 5.75239E-11<br>$\alpha_{10}$ -9.08667E-14<br>$\beta_4$ 5.82757E-06<br>$\beta_6$ -1.35462E-08<br>$\beta_8$ 1.96576E-11<br>$\beta_{10}$ -1.56047E-14<br>$\beta_{12}$ 5.13234E-18 | | 1.53373<br>Y -13.334<br>Z 37.912 | 56.23<br>$\theta$ 29.44° |
| 7 | $R_y$ -356.739<br>$R_x$ -171.619<br>$K_y$ 0<br>$K_x$ 0<br>$\alpha_4$ 3.56935E-06<br>$\alpha_6$ -3.61575E-08<br>$\alpha_8$ 1.86442E-10<br>$\alpha_{10}$ -3.50641E-13<br>$\beta_4$ -1.02012E-06<br>$\beta_6$ 9.79439E-09<br>$\beta_8$ -1.48273E-11<br>$\beta_{10}$ -1.06208E-13<br>$\beta_{12}$ 1.92344E-16 | | 1.53373<br>Y 9.222<br>Z 32.712 | 56.23<br>$\theta$ -4.630° |
| 8 | $R_y$ PLANO<br>$R_x$ PLANO | | 1.53373<br>Y 17.962<br>Z 41.416 | $\theta$ -51.329 |
| 9 (IMAGE-DISPLAY) | $R_y$ PLANO<br>$R_x$ PLANO | | Y 24.013<br>Z 44.940 | $\theta$ 15.975° |

FIGURE 7. An Exemplary Optical Design Prescription

NEAR EYE DISPLAY PRISM OPTIC ASSEMBLY

GOVERNMENT INTEREST

The invention described herein may be manufactured, used, sold, imported and/or licensed by or for the United States Government.

FIELD OF THE DISCLOSURE

The disclosure relates to near eye, head or helmet-mounted display systems, weapon sight viewers, and handheld viewing devices, incorporating micro-display technologies.

BACKGROUND INFORMATION

Most prior art in the area of monolithic prisms for micro-display imaging have similar properties. Such patents describe a prism with three optically-active surfaces, which can be used with and without a corrector optic.

Recent developments in micro-display technology have created large-format, full-color micro-displays. A new near-eye optical imaging approach is needed to fully realize the size and resolution of these displays with wide fields of view and large eye pupils. Also to use such a device effectively in a system concept, the imaging device must allow a large range of diopter adjustment for comfort and must conserve power by not requiring digital image remapping of the displayed image.

Similar previous work employs a monolithic prism for presenting micro-display imagery to the eye in a compact, low-profile manner. These monolithic prisms utilize multiple internal reflections to image a micro-display to the eye. For example, U.S. Pat. No. 5,745,295 describes such an apparatus, including an image display device and an ocular optical system for displaying an image of the display device. While such known display image sources can scale to diagonal dimension of less than or equal to 15 mm, these known sources will have several performance flaws if scaled to image sources with a diagonal dimension of greater than 15 mm. This is due to the limited optical path associated with such known prism arrangements. Further, such prior art disclosures (e.g., U.S. Pat. No. 5,745,295) describe embodiments that have discontinuities in optical surface profiles which preclude scaling without extensive redesign.

SUMMARY

The present disclosure uniquely addresses solutions to the flaws in such known works, e.g., lack of focus in the absence of a digital remapping of imagery, asymmetric distortion, requirement of digital remapping of imagery, small eye relief (<25 mm), small pupil (4 mm), small usable array size on the micro-display (<15 mm), small field of view (<40°×30°), and environmental vulnerability. In another aspect, scalable optical configurations are disclosed suitable for various display image formats with a diagonal dimension of less than 30 mm.

Exemplary embodiments are disclosed to allow imaging large display format sizes as needed. Such exemplary embodiments can have continuous surface profiles throughout optically active areas on prism optic, which allow large pupil sizes and the ability to be scaled to different sizes and formats.

Further, prisms made of molded plastic for low weight and ease of application of an aspheric surface can be utilized. All optical plastic elements require glass sacrificial windows to protect the delicate plastic material during normal use, decreasing the usable eye relief of such a device. The corrector optic is chosen in an exemplary embodiment to deliver the 25 mm eye relief for ease of use while providing environmental protection for the prism. Such an exemplary embodiment can address the need of a pupil up to 6 millimeters in diameter, a large eye relief of 25 millimeters, and display diagonals of up to 24.6 millimeters simultaneously in a package that will fit on a helmet mount, weapon sight, or handheld viewer and will be protected from environmental hazards. Additionally, such an exemplary embodiment can be telecentric and have negligible chromatic aberration and distortion, which can allow it to be used as a full-color photopic, digital display device without any digital image re-mapping for a large range of diopter focus.

Low and symmetric distortion can be attained by making the surface nearest to the display flat and controlling magnification nearer to the pupil. Low and nearly-symmetric distortion make this a scalable design because the image does not warp when scaled.

The corrector group is selected such that it sufficiently balances the backward curving field and provides excellent chromatic correction. This radially-symmetric correction is applied near to the pupil, and therefore has little effect on distortion. The prism is configured in conjunction with this corrector group to produce negligible distortion effect at the object plane that is extremely symmetric in comparison to prior art.

Such a unique configuration can also allow a telecentric optical path in object space such that the focus of the eyepiece can be adjusted +1 to −2 diopters without any significant magnification errors or warping of imagery. Prior art does not specifically teach this. Rather, prior art requires warping tables to digitally remap the imagery at nominal focus and any different diopter settings.

Such a micro-display technology as variously embodied can create much larger format arrays, which can have slightly smaller pixels. Also, uses of such devices requiring larger fields of view can be satisfied. The present disclosure addresses these concerns, including the needs for a large-format display.

Accordingly, one aspect of the present disclosure relates to an optical configuration that is reproducible, uses a prism optic in conjunction with a glass collimating optic, and presents imagery of a micro-display to the eye.

Another aspect of the present disclosure is to provide focus ability, low-power implementation, large field of view, exit pupil, eye relief for a large-format, and full-color micro-display.

In one exemplary embodiment, lightweight, plastic prism Optic is used with an aspheric surface in conjunction with a glass corrector optic to magnify the image of a micro-display and very comfortably present the immersive imagery to a user.

Such an exemplary embodiment can nominally provide a 40×30 degree, rectangular field of view of a 24.6-millimeter-diagonal, full-color, micro-display at a 25 millimeter eye relief for an axial exit pupil that is 10 millimeters in diameter, decreasing to a 6 millimeter exit pupil for the corner field angle. Furthermore, the optical features can be scaled to fit several display sizes at multiple fields of view. Such an embodiment as exemplified can be scalable to have the same field of view and eye relief on a 30-millimeter-diagonal display.

BRIEF DESCRIPTION OF THE DRAWINGS

The detailed description is provided in reference to the attached drawings wherein:

FIG. 2 is an exemplary housing and focus mechanism shown with such a prism optic assembly.

FIG. 3 is a plot of the orthoscopic, near-radially-symmetric distortion profile that is achievable with such an exemplary prism optic assembly.

FIG. 4 is a plot of the astigmatic field curves showing the flat field curvature that is achievable with such an exemplary prism optic assembly. The vertical lines on the plots denote the equivalent focus positions of +0.25 and –0.33 diopters.

FIG. 5 is a plot of the lateral color correction that is achieved with such an exemplary prism optic assembly.

FIG. 6 is an exemplary plot of the average of radial and tangential modulation transfer function at selected points within the full 40-degree by 30-degree field of view of an exemplary embodiment.

FIG. 7 illustrates an exemplary optical design prescription according to the disclosure.

DETAILED DESCRIPTION

Figure 1:
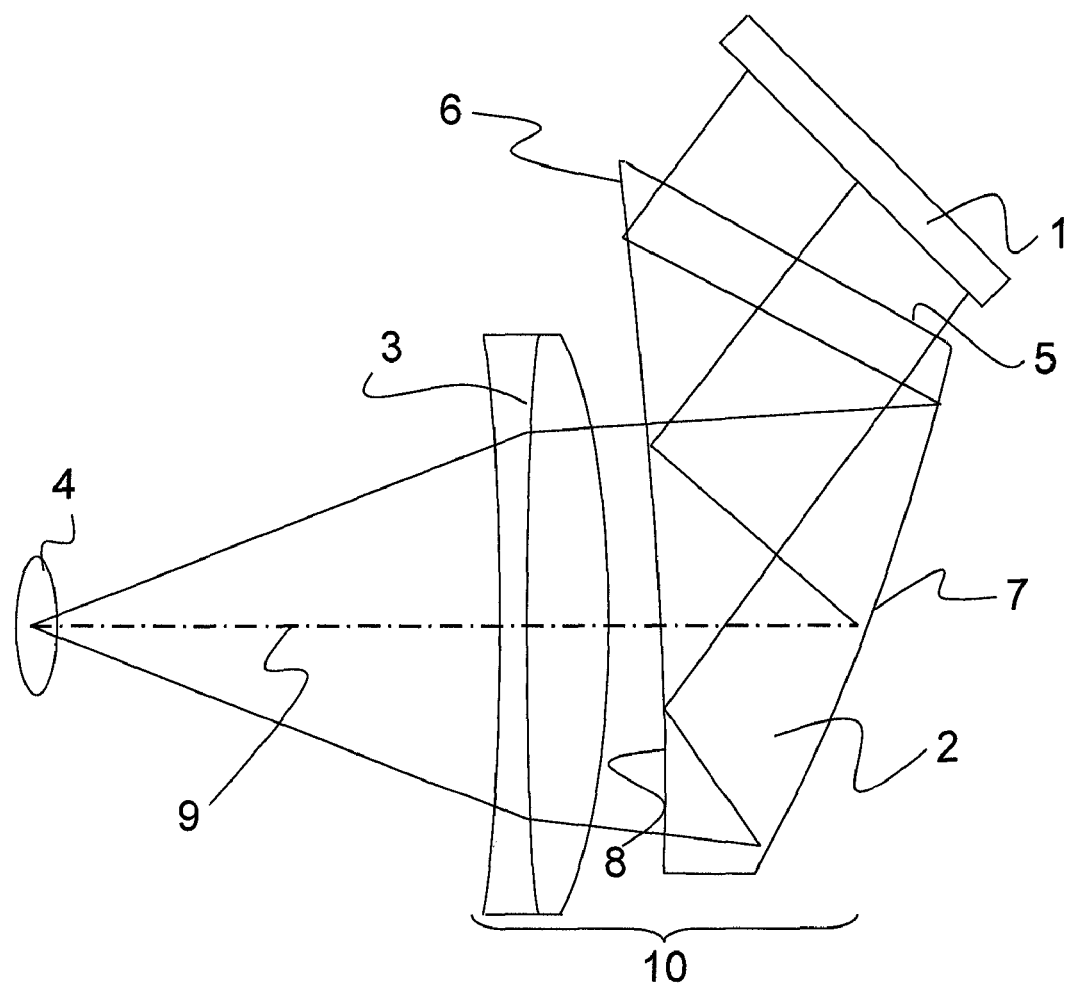
FIG. 1 is a schematic representation of an exemplary embodiment of prism optic assembly.

A detailed description is provided in reference to an exemplary embodiment shown in FIG. 1.

FIG. 1 illustrates an optical schematic of an exemplary embodiment of Prism Optic Assembly (POA). This figure shows an exemplary layout of the integrated optical components and depicts a representation of the optical path from a micro-display 1 to the eye 4 in a horizontal view of a vertical cross-section as shown.

The POA 10 comprises an optical member 2 and a corrector lens grouping 3. The optical member 2 has three adjacent optical surfaces, two of which are curved surfaces; the other surface is flat. The volume between these surfaces together with their mutually orthogonal edge faces is filled with an optical polymer. Such a prism optic is ideally comprised of an optical plastic that can be diamond turned or molded to create the 3 optical surfaces and mechanical mounting features. However, this prism can also be molded or ground in glass or some other optical material that transmits visible radiation.

Light rays emitted from the flat panel display surface 1 enter the optical member 2 through the first transmitting surface 5 and are subsequently reflected by the first reflecting surface 6. The first reflected light rays are again reflected by the second reflecting surface 7, whereupon they are led to the observer's eye pupil 4 via a second transmitting surface 8 and the respective transmitting optical surfaces of the corrector lens grouping 3. The first reflection at surface 6 is enabled by total internal reflection (TIR). A back-coated mirror accomplishes the second reflection at surface 7. Surfaces 6 and 8 are, in reality, one in the same surface. They are differentiated solely on the basis of the reciprocating ray surface sequence through the optical member 2.

The optical surfaces of optical member 2 are tilted and decentered with respect to a reference axis 9, which is the axial principal ray that passes through the center of the eye pupil 4.

In order to correct the POA for the image errors induced by tilted and decentered surfaces, the curved surfaces of optical member 2 are anamorphic, wherein the surface geometries are independent in the X- and Y-axes. The sag of an anamorphic surface is given by the expression $$z = \frac{c_x x^2 + c_y y^2}{1 + \sqrt{1 - (1+k_x)c_x^2 x^2 - (1+k_y)c_y^2 y^2}} + \sum_{i=1}^{16} \alpha_i x^i + \sum_{i=1}^{16} \beta_i y^i.$$

where, $$c_x = \frac{1}{R_x}, \quad c_y = \frac{1}{R_y}.$$

$k_x$ and $k_y$=conic constant in x and y,
$\alpha_i$=aspheric coefficients on powers of x,
$\beta_i$=aspheric coefficients on powers of y.

Anamorphic surfaces are not rotationally symmetric, however, they are bi-laterally symmetric (about the Y-axis).

The optical surfaces of the corrector lens grouping 3 are spheres, all of which are centered on the reference axis 9.

With such an exemplary embodiment, because some of the surfaces of the POA are tilted and decentered about a reference axis, such first-order properties that are normally derived from paraxial ray tracing would be inapplicable, and therefore are invalid. Therefore, it was necessary to use exact ray tracing to calculate attributes such as focal length, numerical aperture, image height, entrance and exit pupil positions, etc.

Adjusting diopter focus on this optical assembly can be achieved in two ways: by moving the corrector optic 3, or by moving the micro-display 1.

FIG. 2 is an exemplary housing and focus mechanism shown with such a prism optic assembly. Adjustment of diopter focus of the exemplary embodiment is also shown with respect to FIG. 2. Diopter focus is achieved by moving micro-display 1 and its associated back-light and electronics together as micro-display assembly 12 in the direction indicated by arrow 11. Micro-display assembly 12 is oriented perpendicular to reference axis 19, which is the axial principal ray that passes through the center of the eye pupil in object space. Micro-display assembly 12 is centered about reference axis 19. Drive motor 13 can actuate linear drive mechanism 14 to move the micro-display assembly 12 along the length of reference axis 19 to achieve diopter focus. Another linear drive mechanism 15 can operate simultaneously to linear drive mechanism 14, and a rail that lies parallel to 14 and 15 control the orientation of micro-display assembly 12, e.g., to be always perpendicular to reference axis 12 throughout the full range of diopter focus.

In yet another aspect, minor adjustment to diopter focus can be achieved by moving corrector optic 3 along reference axis 9, e.g., in the directions indicated by arrow 18. In this another aspect of the exemplary embodiment, corrector optic 3 has a positive optical power, and therefore may not efficiently allow diopter adjustment. The corrector optic can move, e.g., 2 mm to achieve a diopter change of 0.5 D. However, corrector optic 3 can better effectively adjust the magnification of the prism optic assembly. For applications that require precision tuning of magnification, corrector optic 3 can be positioned along reference axis 9, e.g., through the use of machined lens spacers and precision-machined lens housings to achieve fine-tuning of the focal length of the prism optic assembly. Focal length of the prism optic assembly can be adjusted in this manner over a range, e.g., of 0.5 mm with negligible effect to system performance.

The corrector optic 3 also provides an environmental seal for the prism optic 2 when this assembly is mounted in a package. An exemplary embodiment of the mounted prism optic assembly is shown in FIG. 2. Such an exemplary embodiment would have the prism optic 2 comprised of an optical plastic, which can be susceptible to scratching, moisture, and other environmental hazards. In this exemplary embodiment, corrector optic 3 is comprised of glass material. Corrector optic 3 can be sealed to the housing at location 17 either with adhesive or elastomeric seal to form an airtight seal around its annular contact area with the lens housing 16. Such an exemplary corrector optic 3 can provide a ruggedized protection for the prism optic 2.

The corrector optic 3 allows this optical assembly to have a long eye relief, large field of view, and large optical pupil, while still remaining compact in size. Such an exemplary embodiment can be used in handheld, weapon-mounted, or head-mounted scenarios, and can be configured to mount on a headgear, e.g., a helmet, which is the most size-limiting employment of a head-mounted optic.

The optical assembly as described uses a flat surface closest to the micro-display, a correcting optic, and an aspheric surface that are designed in conjunction to provide a very low-magnitude, symmetric optical distortion.

Optical distortion is a common aberration in prior art, and is defined as a change in focal length with field angle; or more commonly, an aberration that alters the shape of an image. Prism optics inherently exhibit non radially-symmetric distortion due to their use of off-axis, tilted optical surfaces with optical power. An exemplary embodiment of the present disclosure will exhibit optical distortion as shown in FIG. 3. The line grid in FIG. 3 represents a perfect image with 0% distortion. The small "X" symbols denote the distorted location of the grid intersections and represent the distorted image as formed by the prism optic assembly. The maximum distortion in an exemplary embodiment of this disclosure is less than 1.32%. This maximum occurs at the extreme corners of the field of view, at 25-degree field angle from the optical axis. This amount of distortion is not noticeable by the human eye, and is considered to be orthoscopic, meaning free of distortion. The distortion exhibited by the exemplary embodiment is nearly radially-symmetric about the viewing optical axis, which creates imagery that is very similar to that provided by more conventional lens optics. Even if the magnitude of the distortion was increased to become noticeable in alternative exemplary embodiments, the nearly axially-symmetric profile would still provide a high level of comfort for the user of this device. FIG. 1 indicates the features employed by the exemplary embodiment of the current disclosure to uniquely control distortion to levels below human perception. Corrector optic 3 applies radially symmetric optical power and balances negative field curvature, thereby reducing the optical power required by the surfaces of the prism. Furthermore, optical surface 5 on the prism is flat, and contributes no optical power. Optical surface 5 is located near to the focal plane, and therefore any optical power on this surface contributes almost completely to field curvature and distortion. The exemplary embodiment eliminates optical power on this sensitive surface to reduce distortion and control distortion symmetry.

An exemplary embodiment of this optical assembly provides a 25-millimeter eye relief when viewing a 40-degree horizontal by 30-degree vertical field of view on a 19.2×15.36 millimeter, color micro-display. The designed optical pupil is 4 millimeters in diameter, and provides equivalent axial optical performance when positioned at any X-Y location within a 6 millimeter circle centered on the assembly's optical axis at the eye pupil plane. Also, the optical assembly provides adequate optical performance for all off-axis fields at X-Y displacements of the 4 millimeter pupil that decrease with field angle down to 1 millimeter when viewing the corner field on the micro-display. The pupil size of this invention is a feature that provides for a very comfortable, immersive viewing of the micro-display imagery. This comfort level makes the exemplary embodiment(s) ideal for an immersive display in commercial applications and as well as field mobility and targeting applications.

FIG. 4 shows exemplary astigmatic field curves of the exemplary embodiment. The curves depict focal performance better than what the human eye can perceive. The exemplary embodiment achieves this performance by using corrector optic 3 (as shown in FIG. 1) to balance the negative field curvature induced by the prism optic. The vertical axes of the plots in FIG. 4 indicate the radial field angle within the image relative to an axial position in the center of the field of view. The horizontal axes denote positions along the optical axis in object space, centered about the ideal focal plane at position 0 (zero) The dashed curves represent the ideal focus position that the exemplary embodiment creates in object space. The long dash is labeled "S" and represents the sagittal (radial) focus. The short dash is labeled "T" and represents the tangential focus. The difference between the sagittal and tangential foci is known as "astigmatism". The solid vertical lines in the plots in FIG. 4 represent the human eye's imperceptible accommodation limits. The human eye can accommodate to focus within −0.33 diopters and +0.25 diopters of its nominal focus position subconsciously with no effort, and no defocus within these bounds is perceivable. The plots show that for field angles in the positive vertical (denoted +Y), negative vertical (denoted −Y), and the horiztonal (denoted +X, and is symmetric and equal to the performance in the negative horizontal, so is not listed) directions, the focus of the exemplary embodiment is perfect within the human ability to perceive.

FIG. 5 is a plot of the exemplary embodiment performance with respect to lateral chromatic aberration. The exemplary embodiment uses the corrector optic together with the prism optic to balance chromatic aberration throughout the photopic spectrum for full-color performance. The photopic human eye responds primarily to all wavelengths from 0.47 µm to 0.65 µm. The vertical axis in FIG. 4 depicts the field angle relative to an axial position in the center of the field of view. The horizontal axis shows radial distance from the focus of 0.55 µm light. This axis depicts the lateral focus position for select colors within the photopic spectrum. The vertical lines in FIG. 5 show limits to human perception of chromatic aberration in an optical system, within which aberrations are imperceptible. The vertical solid line indicates the diffraction limited blur spot diameter, or "Airy diameter". This diffraction-limit is the absolute minimum measurable unit with any optical measurement device. The vertical long-dash line indicates the diameter of a 15-micron pixel, which is common in the art.

Chromatic aberration is an image blur caused by an optic focusing separate color wavelengths differently from one another. The primary chromatic aberrations are axial and lateral. Axial chromatic aberration occurs when each color focuses at a different distance along the optical axis, and appears as circular blur spot. The spot typically shows either a blue or red ring around a white spot. Lateral chromatic aberration occurs when each color focuses at a different field height, and appears as an oblong, rainbow-colored spot. Lateral chromatic aberration is typically corrected by using several different glass types with different properties. Lateral chromatic aberration is the most challenging chromatic aberration to correct in a prism optic assembly due to the use of a prism optic that is made entirely of the same material. The exemplary embodiment employs the corrector optic and its glass material properties along with the prism optic together to balance lateral chromatic aberration for full-Color performance.

FIG. 6 shows the modulation transfer function (MTF) of the exemplary embodiment. MTF is a commonly accepted performance metric for optical systems. MTF is a measure of image blur in that is describes modulation between the brightest and darkest areas between two equal blur spots created by an optical system at a particular location in an image, at a particular distance from each other. The particular distance from each other is measured in spatial frequency, with typical units of cycles per millimeter (cy/mm). MTF is measured in percent, with perfect modulation of 100%, and cutoff with no modulation at 0%. FIG. 6 is a 2-dimensional representation of the entire image area presented by the exemplary embodiment for a full field of view of 40-degrees horizontal by 30 degrees vertical. The numbers in the chart are the average MTF values (in units of percent) at that particular location within the image field of view. The average MTF is a weighted average of MTF results for each color within the photopic spectrum, and an equal-weighted average of sagittal (radial) and tangential MTF results. Sagittal and tangential MTF are simply descriptions of blur in the vertical and horizontal directions, respectively. The human eye essentially sees an average of all these results as a common blur, and so this measurement is an effective description of performance. The MTF results for the exemplary embodiment in FIG. 6 are sampled at 34 cy/mm, which corresponds to the maximum spatial frequency visible when using the exemplary embodiment with a micro-display that is made up of 15-micron pixels.

Shown in FIG. 7 is an exemplary optical design prescription. The columns are described as follows: "Surf No." indicates the Surface number within the optical path as traced from the pupil of the eye to the micro-display focal plane. "Radius of Curvature" describes the surface curvature of each the surfaces in the optical path. Radius of curvature is given in units of millimeters. The variables in the "Radius of Curvature" column are coefficients that are used in the following formula to describe the sag (z) of each surface along that surface's optical axis.

$$z = \frac{c_x x^2 + c_y y^2}{1 + \sqrt{1 - (1+k_x)c_x^2 x^2 - (1+k_y)c_y^2 y^2}} + \sum_{i=1}^{16} \alpha_i x^i + \sum_{i=1}^{16} \beta_i y^i.$$

Note that in the formula: $C_x = 1/R_x$, and $c_y = 1/R_y$. Aspheric surfaces are described with multiple constants that can be placed into the formula to calculate the sag of the aspheric surface to be machined or molded to re-create the proper surface curvature of the exemplary embodiment.

Further, "Surface Separation" as shown in FIG. 7 provides the thickness in millimeters along the optical axis between the vertices of each of the surfaces. The prism surfaces do not contain values in this column, as they do not lie on the optical axis. "Refractive Index (Displacement)" first gives the refractive index of the optical material for each surface at the 0.55 μm wavelength. Secondly, this column provides the Y and Z locations in 3-dimensional space, relative to the pupil (surface 1) in millimeters. "Abbe No. (Tilt Angle)" first provides the Abbe number of the optical material for each surface in the exemplary embodiment. Secondly, this column provides the tilt angle for each optical surface, signified by the symbol theta (θ) and given in units of degrees. The optical prescription in FIG. 7 depicts the exemplary embodiment in a position that images at the −1 diopter setting. Diopter changes are Made by adjusting the position of surface 9, as shown in FIG. 7.

In summary, exemplary embodiments as shown in FIG. 1 can use a 3-surface prism 2 and corrector optic 3 to image a microdisplay device 1 to the eye. Further, a flat surface 5 can be disposed near a display plane to allow distortion to be uniquely controlled by a corrector optic 3 and the two anamorphic aspheric surfaces (e.g., 6/8 and 7 of FIG. 1) such that it is negligible, or orthoscopic. A centered, symmetric corrector lens 3 and the flat surface 5 of the prism 2 allow us to uniquely achieve low distortion and telecentricity.

Further, the display focal space can be uniquely telecentric with a maximum chief ray angle of 0.4 deg across an entire (e.g., 19.2×15.36 mm rectangular) display area; allowing for no apparent magnification or performance change throughout a large range of travel for diopter-focus adjustment. For example, 3.25 diopters of adjustment can be made before there is even 1 pixel of magnification change. The flat surface 5 and corrector optic 3 features interact with the anamorphic asphere surfaces to allow such an exemplary embodiment to achieve the unique attributes of, e.g., long eye relief (25 mm), large display area (19.2×15.36 mm with 40-deg×32-deg FOV), and scalability to different format sizes.

Accordingly, such a prism-optic assembly can achieve:
Nearly symmetric distortion;
negligible orthoscopic (negligible . . . <1.32%) distortion (see, e.g., FIG. 2);
one flat surface (see, e.g., 5 of FIG. 1) at surface closest to display;
long eye relief (25 mm+);
large display area (19.2×15.32 mm);
telecentric (only 0.4 deg variation in field angle across display . . . good diopter focus);
diopter range without digital warping;
scalable to other formats and sizes;
diopter range +1 to −2 D, and maybe larger;
corrected chromatic aberration;
6 mm eye pupil;
biconic Zernicke anamorphic asphere;
doublet corrector element;
3 surface prism; and/or
all surfaces are continuous throughout optical area. Centered, symmetric corrector lens (e.g., 3 of FIG. 1) and the flat, display-side surface (e.g., 5 of FIG. 1) of the disclosed exemplary prism (e.g., 2 of FIG. 1) allow us to uniquely achieve low distortion and telecentricity. These exemplary features, along with the disclosed anamorphic asphere surface, can help to achieve the long eye relief, large display area, and scalability.

The invention has been described in an illustrative manner. It is to be understood that the terminology which has been used is intended to be in the nature of words of description rather than limitation. Many modifications and variations of the invention are possible in light of the above teachings. Therefore, within the scope of the appended claims, the invention may be practiced other than as specifically described.

What we claim is:

1. A near eye display prism optic assembly, comprising:
A micro-display configured with linear drive mechanisms;
an optical member having at least three adjacent optical surfaces, two of optical surfaces being curved surfaces, and a third optical surface being flat; and
a corrector lens grouping comprising a centered and symmetric corrector lens movably configured along a reference axis to allow adjustment to diopter focus, wherein at least one of the micro-display and said corrector lens grouping can be moved to adjust diopter focus.

2. The near eye display prism according to claim 1, wherein the optical member is a plastic optical prism having the optical surfaces.

3. The near eye display prism according to claim 1, wherein the optical member is filled with a plastic optical polymer in the volume between said optical surfaces.

4. The near eye display prism according to claim 1, wherein the optical member is a prism of glass or other optical material that transmits visible radiation.

5. The near eye display prism according to claim 1, wherein said optical member comprises a prism having at least a flat optical surface and two anamorphic aspheric optical surfaces.

6. The near eye display prism according to claim 1, wherein said corrector lens grouping comprising a centered and symmetric corrector lens movably configured optical relation to said third optical surface of said optical member allows a minor adjustment to diopter focus and achieves low distortion and telecentricity.

7. A method for near-eye display based on a prism optic assembly, comprising:
emitting light rays from a movable flat panel display surface based on a linear drive mechanism, the emitted light rays being referenced by an axis representing an axial principal ray;
transmitting said emitted light rays through a first optical surface of an optical member, said first optical surface being a flat transmitting surface;
first reflecting said transmitted tight rays by a first reflecting surface of said optical member;
second reflecting said first reflected light rays by a second optical reflecting surface of said optical member; and
second transmitting said second reflected light rays through a second transmitting surface for adjustable focusing towards an observer's eye, wherein said second transmitting surface and said first reflecting surface are provided by a common optical surface of said optical member, wherein a corrector lens grouping is movably configured along said axis to allow adjustment to diopter focus.

8. The method for near-eye display according to claim 7, wherein said first reflection is by a total internal reflection from said first reflecting surface, wherein a mirror back-coated onto said second optical reflecting surface achieves said second reflection, and wherein said first reflection and said second transmission are based on said common optica surface of said optical member.

9. The method for near-eye display according to claim 7, wherein one or more of said optical surfaces of said optical member are tilted and/or decentered with respect to a reference axis representing said axial principal ray.

10. The method for near-eye display according to claim 7, wherein said flat transmitting surface is disposed near a display plane defined in relation to said movable flat panel display surface, and wherein said second optical reflecting surface and said common optical surface of said optical member are anamorphic aspheric surfaces of a plastic optical prism that is diamond turned or molded to create the optical surfaces.

11. The method for near-eye display according to claim 7, wherein at least one of said movable flat panel display surface and said corrector lens grouping cooperate to adjustably focus said second transmitted light rays with respect to a reference axis representing said axial principal ray projecting to a center of the eye pupil.

12. The method for near-eye display according to claim 11, wherein said corrector lens grouping movably configured in relation to said first optical surface of said optical member adjustably images a color micro-display with low distortion and telecentricity with a maximum chief ray angle of 0.4 deg across at least a 19.2×15.36 mm rectangular display area.

13. The method for near-eye display according to claim 11, wherein said optical surfaces of said optical member and optical surfaces of said corrector lens grouping are configured such that long eye relief (25 mm), a large display area of at least 19.2×15.36 mm with 40-deg×32-deg FOV, and scalability to different format sizes.

14. An optical assembly comprising:
a color micro-display image source configured with linear drive mechanisms;
a plastic prism with one flat surface to receive said color micro-display image; and
a collimating optic lens to provide the capability of imaging said color micro-display to a viewer's eye, wherein said collimating optic lens and said flat prism surface are optically configured for aberration-free diopter adjustment of at least one of said color micro-display image source and said collimating optic lens towards reduced, nearly-symmetric distortion in said viewed image, wherein said collimating optic lens is movably disposed to allow a minor adjustment to diopter focus.

15. The optical assembly according to claim 14, wherein said collimating optic lens provides environmental protection of said plastic prism.

16. The optical assembly according to claim 14, wherein said color micro-display image from said micro-display enters the plastic prism from said flat surface, is reflected two times within said plastic prism, each reflection being against a respective anamorphic aspheric surface, and exits the prism via one of said anamorphic aspheric surfaces.

17. The optical assembly according to claim 16, wherein said exiting image passes through the collimating optic lens to be viewed by the eye.

18. The optical assembly according to claim 14, wherein said optical assembly provides a field of view, eye-relief and exit pupil for viewing a full-color micro-display with a diagonal of at least 24.6 millimeters.

19. The optical assembly according to claim 18, wherein said lull-color micro-display can be driven by said linear drive mechanisms for perpendicular movement based on a rail arrangement, and can scale up to a 30-millimeter diagonal display.

* * * * *